United States Patent
Cohen

(10) Patent No.: US 7,869,231 B2
(45) Date of Patent: Jan. 11, 2011

(54) SYSTEM AND METHOD FOR SYNCHRONOUS RECTIFIER DRIVE THAT ENABLES CONVERTERS TO OPERATE IN TRANSITION AND DISCONTINUOUS MODE

(75) Inventor: Isaac Cohen, Dix Hills, NY (US)

(73) Assignee: Texas Instruments Incorporated, Dallas, TX (US)

( * ) Notice: Subject to any disclaimer, the term of this patent is extended or adjusted under 35 U.S.C. 154(b) by 365 days.

(21) Appl. No.: 12/221,101

(22) Filed: Jul. 31, 2008

(65) Prior Publication Data
US 2010/0027298 A1    Feb. 4, 2010

(51) Int. Cl.
*H02M 3/335*    (2006.01)
(52) U.S. Cl. ............... 363/21.14; 363/21.15; 363/21.18
(58) Field of Classification Search .............. 363/21.14, 363/21.15, 21.18
See application file for complete search history.

(56) References Cited

U.S. PATENT DOCUMENTS

| 2004/0155639 A1* | 8/2004 | Mobers ...................... 323/282 |
| 2005/0152158 A1* | 7/2005 | Gut et al. ..................... 363/16 |
| 2008/0130334 A1* | 6/2008 | Halberstadt ................. 363/123 |
| 2009/0109711 A1* | 4/2009 | Hsu ......................... 363/21.14 |

OTHER PUBLICATIONS

"Secondary Side Synchronous Flyback Controller", Semiconductor Components Industries, LLC, 2007. Publication No. NCP4302.

* cited by examiner

*Primary Examiner*—Bao Q Vu
*Assistant Examiner*—Jue Zhang
(74) *Attorney, Agent, or Firm*—John J. Patti; Wade J. Brady, III; Frederick J. Telecky, Jr.

(57) ABSTRACT

A synchronous rectifier is switched in accordance with a primary switch transition and a reference signal representing current in a current storage device to which the synchronous rectifier is coupled. A current emulator provides a signal representing current in the current storage device as a volt-second product so that current stored in the current storage device while the primary switch is on is discharged by the synchronous rectifier. The use of a current emulator provides an inexpensive solution for controlling synchronous rectifier transitions without resorting to more expensive current sensing solutions that are commercially impracticable. Blanking intervals are provided for avoiding false transitions of the synchronous rectifier when the primary switch turns on and after the synchronous rectifier turns off. The disclosed system and method can be applied to flyback converters for a synchronous rectifier on the secondary side of a transformer, or the inductor of buck converters.

37 Claims, 9 Drawing Sheets

SYSTEM AND METHOD FOR SYNCHRONOUS RECTIFIER DRIVE THAT ENABLES CONVERTERS TO OPERATE IN TRANSITION AND DISCONTINUOUS MODE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present disclosure relates generally to a system and method for a synchronous rectifier drive, and relates more particularly to a low-cost synchronous rectifier drive for use in power converters, particularly flyback power converters operating in transition and discontinuous mode.

2. Description of Related Art

Synchronous rectifiers are typically implemented as a replacement for a diode operating alone to emulate diode operation with improvements in efficiency. Typically, a transistor switch with a low forward conducting resistance and high blocking impedance takes the place of a diode. The switch is turned off to block conduction in one direction, and switched on with current flowing in another direction to provide a low forward voltage drop for conducting current. The switching events are synchronized with voltage or current flows to emulate diode operation.

Applications for synchronous rectifiers include flyback DC-DC converters, such as a circuit 100 illustrated in FIG. 1. Circuit 100 in FIG. 1 operates with a diode D1 as a conventional rectifier on a secondary side of a transformer T1 having a number of turns $N_s$. Flyback converter 100 has an isolated topology with a power switch Q1 on a primary side of transformer T1 having a number of turns $N_p$. Energy is stored in primary winding in power transformer T1 during the on-time of switch Q1, while a load current Iload is supplied by an output capacitor Cout. When switch Q1 is turned off, the energy stored in the primary winding is transferred to the secondary winding of transformer T1 and provided to the output as load current Iload. In addition, the secondary winding supplies a current Is that recharges capacitor Cout to replenish charge lost while capacitor Cout delivered output load current Iload.

In FIG. 2, a flyback converter 120 is illustrated as having a synchronous rectifier in the form of a MOSFET switch Q3 on a low side of the secondary side of transformer T1. Switch Q3 is coupled to a ground reference point to simplify the gate drive operation of switch Q3 for synchronous rectification. In the configuration of circuit 120, one technique for driving switches Q2 and Q3 is to provide complimentary signals to the switches, so that switch Q2 is conducting while switch Q3 is off, and vice versa. However, operating switches Q2 and Q3 in such a configuration presents difficulties for operation of the flyback converter in circuit 120.

One drawback with providing complementary signals to drive switches Q2 and Q3 is that current Is can become negative. If current Is can become negative, then under light or no load conditions the transformer output consists of a positive current pulse followed by an equivalent negative pulse, such that the average transformer output current is small or zero. In this circumstance, a substantial amount of energy is circulated between the input and output of flyback converter 120, resulting in energy losses.

By operating flyback converter 120 in discontinuous or transition mode, there is the potential to reduce the above-described energy losses. Operation in discontinuous or transition mode can be achieved by turning switch Q3 off near the point where current Is begins to reverse.

One technique to control the switching of switch Q3 to potentially reduce energy losses is to use a current transformer for sensing the current reversal on the secondary side of transformer T1. However, the use of a magnetic component to sense current adds complexity and cost to the circuit, so that such a sensing technique is not commercially attractive.

Other control techniques for switching switch Q3 to limit energy losses depend upon sensing a drain-to-source voltage Vds of switch Q3 to determine current flow direction. This technique usually provides for turning switch Q3 on if voltage Vds is positive, and turning switch Q3 off if voltage Vds is negative. Comparators are typically used to determine when voltage Vds is positive or negative to provide a switching control for switch Q3. However, an appropriate switching control for switch Q3 using this technique calls for the use of very high speed, high sensitivity comparators, that are difficult to implement and are prone to faulty operation in the presence of noise, such as typically exists in a flyback converter environment.

Accordingly, it is desirable to provide a relatively low cost synchronous rectifier controller for a flyback converter. In addition, it is desirable to provide a relatively low cost synchronous rectifier controller for other types of power converters, including forward converters. Numerous applications involving power conversion would benefit from such a controller.

BRIEF SUMMARY OF THE INVENTION

The disclosed system and method provides a simplified configuration and technique for synchronous rectification in a power converter. The power converter may be inductor based, and/or isolated, which includes a power converter having a transformer, for example. A synchronous rectification switch in the power converter is turned off to operate the power converter in discontinuous or transition mode. A current emulator provides a signal for determining when the synchronous rectifier should be turned off. The current emulator signal can be provided based on emulation of current in a power converter component, such as an inductor, for example.

In one exemplary embodiment, a flyback converter has a transformer with a synchronous rectifier on the secondary side of the transformer. A current emulator provides a signal that emulates the current in the transformer secondary. The current in the transformer secondary is the same as that in the synchronous rectifier. The signal is used to turn off the synchronous rectifier when the current on the secondary side is falling and reaches approximately zero. This technique using a current emulator permits the flyback converter to operate in discontinuous or transition mode to avoid any significant negative current in the secondary side of the transformer. The current emulator signal turns off the synchronous rectifier without the significant losses that can result from recirculated energy if the current through a second side of the transformer is permitted to become significantly negative.

According to an exemplary embodiment, the current emulator is implemented as a voltage integrator. The voltage on the secondary side of the transformer in the flyback converter is integrated during the on-time of the primary side switch, forming a signal that represents the volt-second product or current applied to the transformer. The integrated voltage is analogous to the ampere turns accumulated in the transformer. Control of the synchronous rectification switch is provided to turn the synchronous rectifier switch on at a falling edge of the Vds voltage of the synchronous rectifier switch, which indicates turn-off of the primary switch. The synchronous rectifier is turned off when the volt-second product applied to the transformer during conduction of the synchronous rectifier is approximately equal to the volt-second product applied during the on-time of the primary switch. The channel of the synchronous rectifier switch conducts for a majority of the interval during which current in the secondary side of the transformer is flowing. Switching the synchronous rectifier according to such a configuration permits operation of the flyback converter in or nearly in discontinuous or transition mode, which avoids a reverse recovery event for the body diode of the synchronous rectification switch.

In an exemplary embodiment of the disclosed system and method, the current emulator is implemented as an integrator with a capacitor that develops a voltage that is proportional to current flowing in an inductor of the power converter. The capacitor is charged and discharged in accordance with the voltage across the inductor and a switching event, such as a primary switch turning off. The capacitor acting as an integrator is reset with each cycle to avoid accumulation of a DC error. The integrator may also be clamped at zero volts to avoid negative voltages. In addition, a rate of charge for the capacitor can be made slightly less than a rate of discharge, so that the capacitor voltage tends to reach zero in a discharge cycle, but is clamped to zero as mentioned above.

According to a feature of the disclosed system and method, undesired transitions of the synchronous rectification switch are avoided by applying blanking intervals during or outside of which control signals or detectors are disabled. In one exemplary embodiment, unwanted control transitions are nullified by starting a blanking timer upon detection of a fast, positive voltage rate of change at the synchronous rectification switch upon primary switch turn on.

According to another exemplary embodiment, protection against cross-conduction between the synchronous rectifier switch and the primary switch is provided by detecting when the primary switch turns on. The detection of primary switch turn-on causes the synchronous rectifier to be turned off. Primary switch turn-on is detected using any one of a number of different techniques, for example, by using a small capacitance and a comparator to detect the fast negative voltage transition during turn-on at the drain of the primary switch. The comparator output is used to turn off, or ensure a turn-off state for the synchronous rectifier on the secondary side of the transformer.

Another exemplary embodiment for detection of primary switch turn-on provides a signal transformer coupled to the primary switch that is used to determine when the primary switch turns on to cause the synchronous rectifier to turn off. The signal transformer can be a pulse transformer coupled to a gate or a drain of the primary switch through a capacitor to provide a pulse that may be used as a logic signal to turn off the synchronous rectifier when the primary switch turns on. A signal transformer may also be used between a primary side of the power transformer and the primary switch to provide a logic pulse to a synchronous rectifier control to turn off the synchronous rectifier when the primary switch turns on. According to another exemplary embodiment, protection against cross-conduction is provided by limiting the on-time of the synchronous rectification switch with a timer. At the expiration of the timer time interval, the synchronous rectification switch is turned off or a turn-off state is ensured or maintained.

In accordance with an another exemplary embodiment of the disclosed system and method, a current emulator is provided that operates on the basis of charging and discharging a capacitor as a voltage integrator that is proportional to current flowing in an inductor of the power converter. The capacitor begins charging at an initial value, and discharges to greater than or less than the initial value during normal operation. For example, the capacitor may have an initial value of zero volts and then be charged and then discharged to a positive or negative value, before being reset for a subsequent cycle. This arrangement can be useful when the power converter is operating in continuous mode, because of the primary switch turn on can be used to turn off the synchronous rectifier, and cause a reset of the current emulator for a subsequent cycle.

The disclosed system and method may be used in power converters that operate at least in part by charging and discharging an inductor, including forward or buck converters. Various other flyback converter topologies may also be employed with the disclosed system and method, including converters with non-isolated transformers, for example.

BRIEF DESCRIPTION OF THE SEVERAL VIEWS OF THE DRAWINGS

The disclosed system and method is described in greater detail below, with reference to the accompanying drawings, in which.

DETAILED DESCRIPTION OF THE INVENTION

Figure 1:
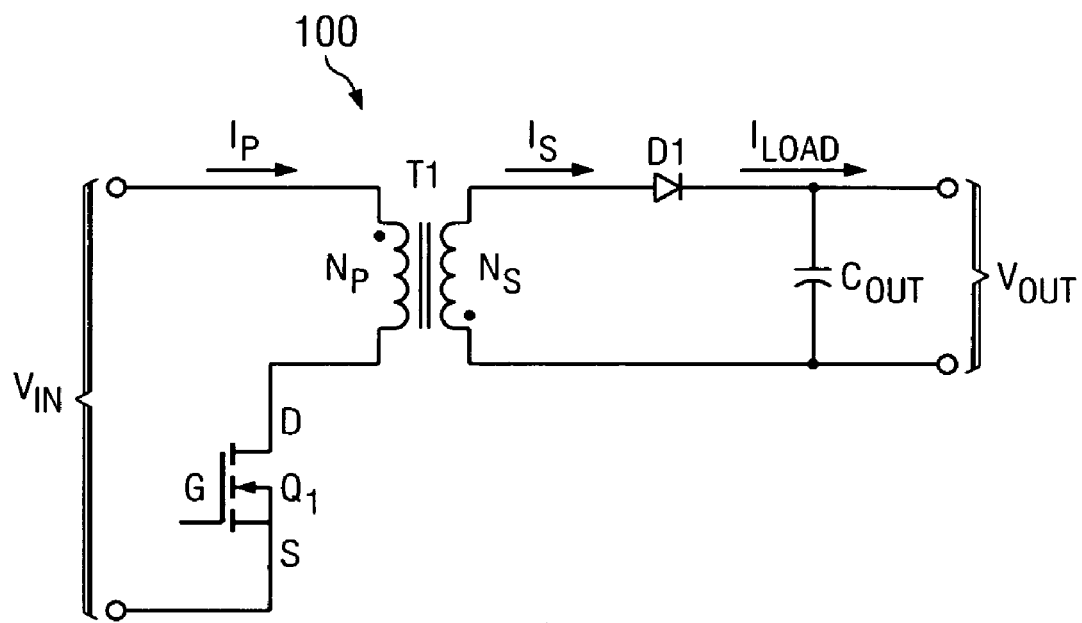
FIG. 1 is a circuit diagram of a conventional flyback converter.
Figure 2:
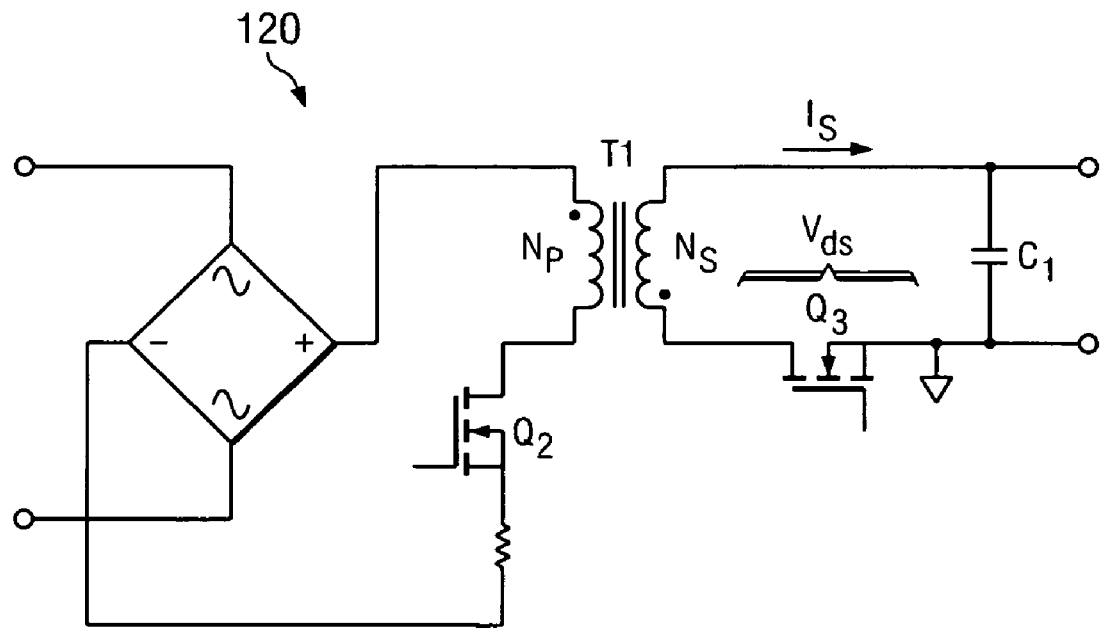
FIG. 2 is a circuit diagram of a conventional flyback converter using synchronous rectification.
Figure 3:
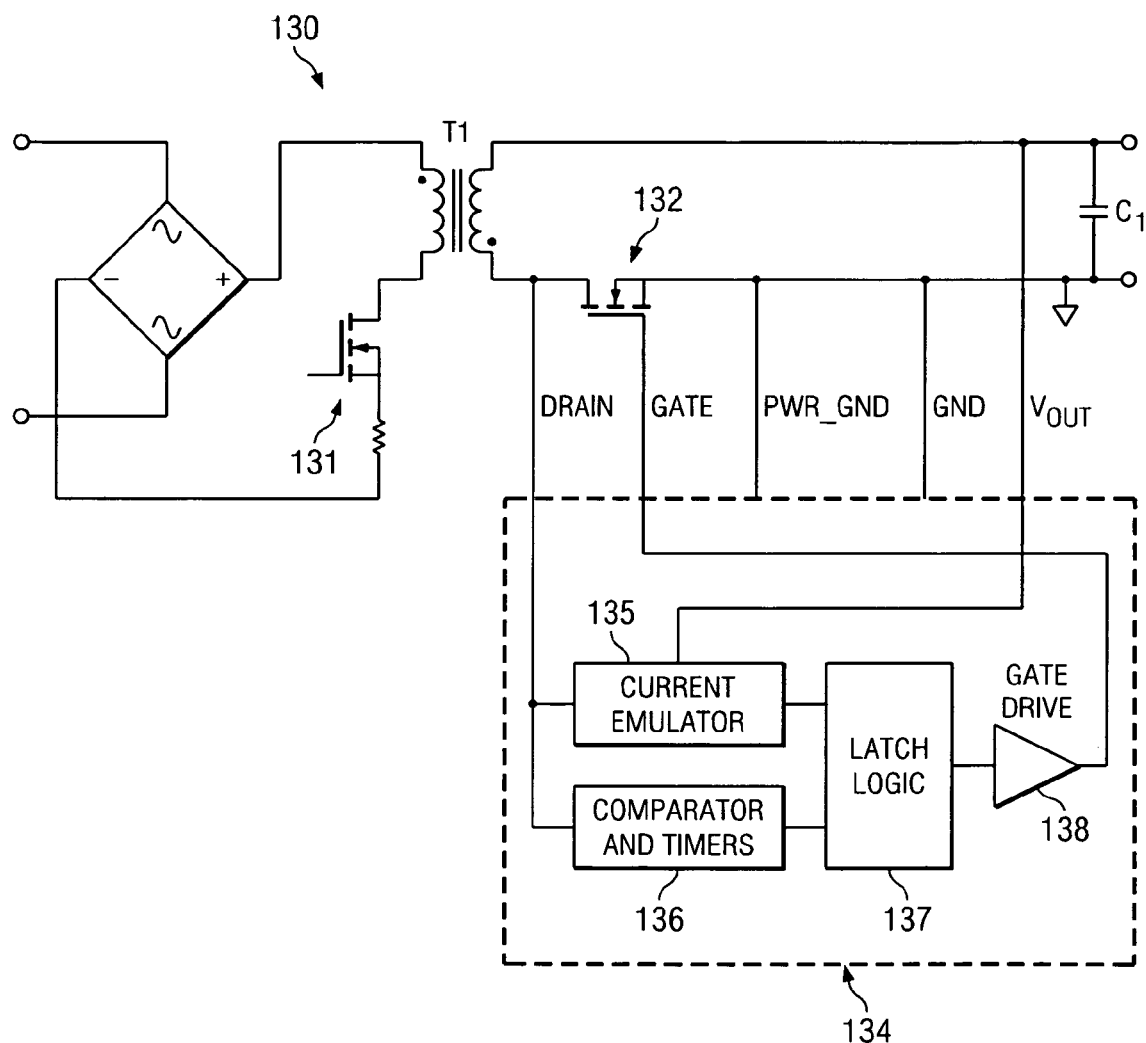
FIG. 3 is a circuit block diagram of a flyback converter using synchronous rectification in accordance with the disclosed system and method.

Referring now to FIG. 3, a block diagram of a flyback converter 130 is illustrated in accordance with an exemplary embodiment of the disclosed system and method. Flyback converter 130 includes a synchronous rectifier in the form of a MOSFET switch 132. Switch 132 is connected between a secondary side of a transformer T1 and a ground reference potential. Switch 132 is operated as a synchronous rectifier based on signals supplied by a controller 134. Controller 134 senses the drain voltage on switch 132, as well as output voltage Vout, and derives a gate control signal applied to the gate of switch 132 to produce synchronous rectification.

Controller 134 includes a current emulator 135 for emulating current in transformer T1. Current emulator 135 senses output voltage Vout and the drain voltage of switch 132 to construct a signal representing the current in the primary side of transformer T1 while primary side switch 131 is on. The signal representing primary side transformer current can be a volt-second product that can be derived on the secondary side of transformer T1. Such a current signal representation avoids techniques or components that obtain current signals directly from the primary side of transformer T1.

Current emulator 135 also produces a signal representative of the secondary side current. The signal representative of secondary side current provided by current emulator 135 may be a volt-second product, the initial value of which depends upon the volt-second product generated for the primary side current. When the current in the secondary side of transformer T1 discharges to approximately zero, current emulator 135 provides a signal for turning off switch 132. The current representation provided by current emulator 135 thus provides a parameter that can be used to control synchronous rectifier switch 132, without directly sensing either the primary or the secondary current. By eliminating a direct measure of the current in either the primary or the secondary side of transformer T1, the cost and size of the control for synchronous rectifier switch 132 is significantly reduced. In addition, typically expensive components used to determine small changes in voltages, as have been used previously, are no longer necessary to realize an efficient synchronous rectifier control. The elimination of such expensive components tends to reduce costs and complexity of the control for synchronous rectifier switch 132, thereby making flyback converter 130 significantly more practicable.

While current emulator 135 contributes a signal for controlling turn-off of synchronous rectifier switch 132, a control block 136 contributes control signals for turning synchronous rectifier switch 132 on. Control block 136 includes a comparator and timers that operate using the drain voltage of switch 132 as an input. Control block 136 senses a negative transition of the drain voltage of switch 132, for example, and compares the voltage to a threshold to determine when primary switch 131 is turning off. As primary switch 131 turns off, control block 136 generates a turn-on signal for synchronous rectifier switch 132.

Current emulator 135 and control block 136 provide signals to latch logic block 137 to control switching of switch 132. The signals to control on/off switching, which are applied to the gate of switch 132, are latched in latch logic block 137. Latch logic block 137 also includes logic to coordinate switching control based on signals provided by current emulator 135 and control block 136 to obtain a desired switching operation configuration. The state of switch 132, that is, either on or off, is determined by a gate drive signal provided to gate drive 138 which produces the appropriate gate drive signals to turn switch 132 on or off. In an exemplary embodiment, gate drive 138 is a high-speed low-side MOSFET driver with an enable function to appropriately drive switch 132 for turn-on or turn-off events.

Control block 136 detects a falling edge of a voltage waveform at the drain of switch 132 to cause switch 132 to turn on. Control block 136 also includes several timers to contribute to proper event detection and turn-on of switch 132. For example, control block 136 includes a blanking interval timer for the voltage waveform on the drain of switch 132 to prevent voltage ringing from causing a false turn-on of switch 132. That is, the secondary side of transformer T1 may experience ringing that may otherwise cause switch 132 to turn on when the voltage on the drain of switch 132 is used as a detection point. Accordingly, the blanking interval timer on the drain voltage on switch 132 avoids transients in the drain voltage from causing inadvertent switching events for a certain period of time to permit the ringing or noise to abate.

In addition, an exemplary embodiment of control block 136 includes a mechanism that causes switch 132 to be turned off, regardless of the state of current emulator 135. The mechanism causes switch 132 to be shut off after a certain event or after a specified period of time to avoid cross-conduction with primary switch 131. Switch 132 may cross-conduct with switch 131 when, for example, the drain voltage on switch 132 does not reach a low enough threshold to indicate zero current through the secondary winding of transformer T1. Such a circumstance may occur if flyback converter 130 is operating in continuous mode, for example, where the current ripple in the secondary side of transformer T1 does not reach zero. Such a circumstance may also occur if the output voltage drops or collapses to prevent current emulator 135 from indicating zero current in the secondary side of transformer T1.

Control block 136 may also provide a blanking interval timer for preventing current emulator 135 from inadvertently re-activating switch 132 at the end of the switching cycle in the presence of ringing or noise. Once control block 136 provides a turn-off signal to turn off switch 132, the blanking interval causes additional turn-off or turn-on transitions to be ignored. Accordingly, even if the current emulator switching signal continues to transition after a switching cycle due to ringing of the drain voltage of switch 132, the state of switch 132 does not change.

Figure 4A:
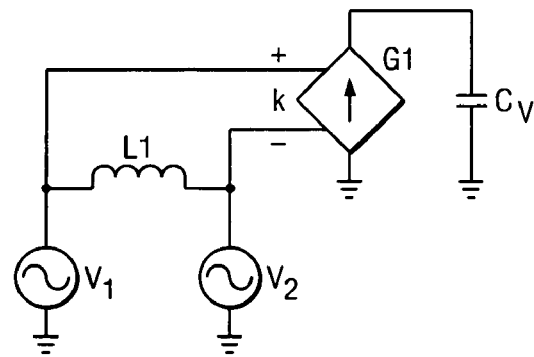
FIGS. 4a, 4b and 4c are circuit and block diagrams illustrating current emulator operation in accordance with the disclosed system and method.
Figure 4B:
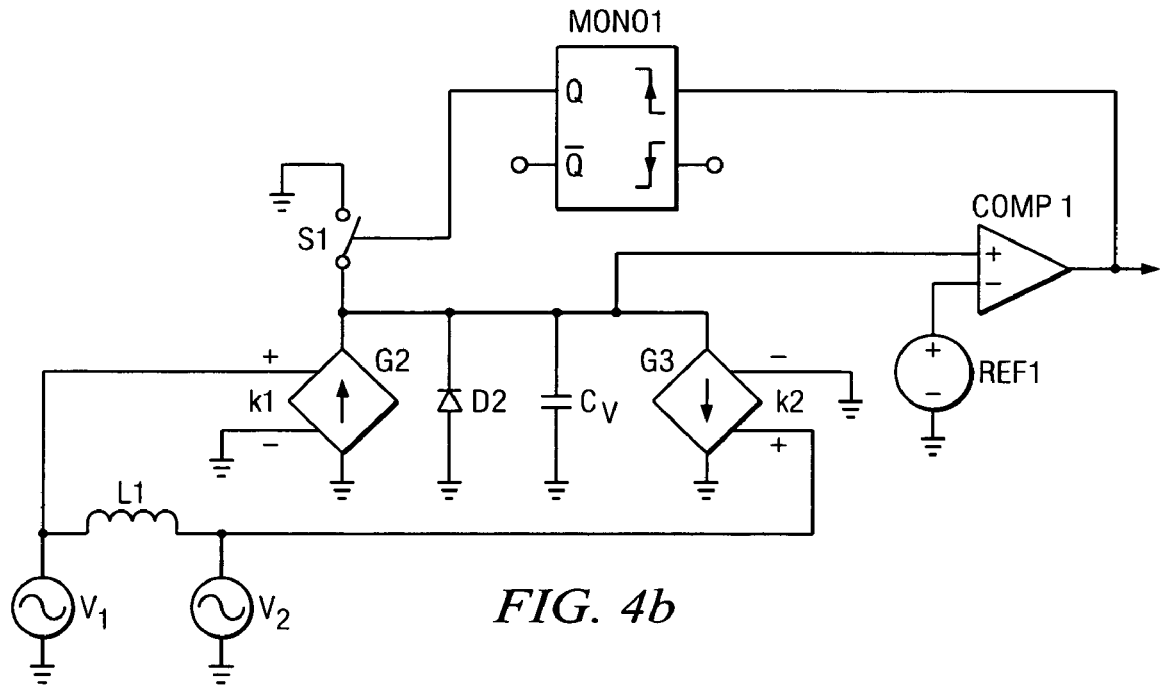
Figure 4C:
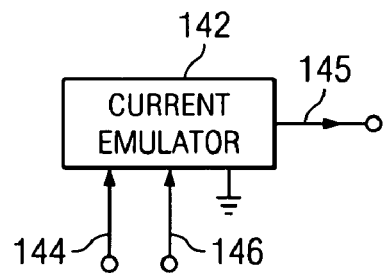

Referring now to FIGS. 4a-4c, circuit and block diagrams are provided to illustrate operation of the current emulator in accordance with an exemplary embodiment of the disclosed system and method. In FIG. 4a, an inductor L1 is shown connected between voltage sources V1 and V2 for the purposes of illustration. A current-to-voltage converter G1 having a conversion ratio of k is also connected across inductor L1. A current produced by the voltage-to-current converter G1 charges a capacitor Cv. The voltage developed across capacitor Cv is essentially the time integral of the current provided by voltage-to-current converter G1. The voltage across capacitor Cv can therefore be written as shown in equation 1.

$$V_{C1} = \frac{1}{Cv} \int (V1 - V2) \cdot k \, dt \qquad \text{(Equation 1)}$$

With respect to inductor L1, and assuming initial zero conditions, the flux in inductor L1 can be written as shown in equation 2.

$$\Phi = \frac{1}{N} \int (V1 - V2) dt \qquad \text{(Equation 2)}$$

where N is the number of turns of inductor L1. Because the flux is proportional to the current in the windings of inductor L1, equation 2 can be rewritten as shown in equation 3.

$$i_L = \frac{1}{N \cdot K_\phi} \cdot \int (V1 - V2) dt \qquad \text{(Equation 3)}$$

where $K_\phi$ is a constant representing the proportionality between current and flux in the windings of inductor L1. Substitutions using equations 1 and 3 show that the voltage on capacitor Cv is proportional to the current flowing in inductor L1.

$$V_{Cv} = I_L \cdot \left( \frac{1}{N \cdot K_\phi \cdot Cv} \right) \qquad \text{(Equation 4)}$$

Accordingly, as illustrated in equation 4, the voltage across capacitor Cv emulates the current flowing in inductor L1.

FIG. 4b illustrates capacitor Cv used to produce a voltage that is proportional to current flowing in inductor L1. In the circuit in FIG. 4b, voltage V1 is applied to the input terminal of the voltage-to-current converter G2, to produce a current that charges capacitor Cv. Voltage V2 is applied to an input of a voltage-to-current converter G3, which is arranged to produce a current that discharges capacitor Cv. Voltage-to-current converters G2 and G3 have respective conversion constants K1 and K2. If K1 is equal to K2, the circuit illustrated in FIG. 4b is equivalent to that illustrated in FIG. 4a, as described with equation 1, above. In practice, however, K1 and K2 will not be exact ideal matches, as might be desired, but instead will be slightly different in value as a matter of practical implementation. The slight difference between constants K1 and K2 causes a slight additive voltage on capacitor Cv over the course of multiple charging and discharging cycles. The additive amount may be positive or negative, depending upon which of constants K1, K2 is greater.

To eliminate the above-described offset accumulation over the course of multiple charging and discharging cycles, the voltage on capacitor Cv is clamped or reset with each complete cycle in an exemplary embodiment. When the cyclical voltage on capacitor Cv is regulated to remove such an offset accumulation, the voltage on capacitor Cv can provide a useful representation of current flowing in inductor L1. Inductor L1 is operated to have current flowing in a single direction, such as is the case in discontinuous or transition mode operation. In accordance with the known operating parameters of transition mode or discontinuous mode, the voltage on capacitor Cv can be clamped to zero with each cycle. In such an exemplary embodiment, constant K1 is set to have a lesser value than constant K2, and diode D2 is used to clamp the voltage on capacitor Cv at zero. Because constant K1 is less than constant K2, capacitor Cv discharges faster than it charges. Assuming capacitor Cv begins charging at zero at the beginning of a cycle, discharging capacitor Cv using voltage-to-current converter G3 causes the voltage on capacitor Cv to reach zero each cycle in normal operation. The voltage on capacitor Cv is prevented from falling below zero with the clamping action of diode D2.

The circuit illustrated in FIG. 4b can be arranged to provide either positive or negative offset accumulation compensation through the values set for constants K1, K2 and the orientation of diode D2. In addition, diode D2 can be configured to permit capacitor Cv to discharge to a voltage value above or below an initial charging value. For example, if capacitor Cv is charged from an initial starting value of zero volts, current converters G2, G3 can be arranged with constants K1, K2 to permit the voltage on capacitor Cv to discharge to a positive value or a negative value before being clamped or reset. In accordance with another exemplary embodiment, diode D2 can be removed so that the voltage value of capacitor Cv is not clamped during a charging and discharging cycle. By permitting the voltage on capacitor Cv to be discharged to a value different than a starting value for the charging portion of the current emulator cycle, the cycle illustrated in FIG. 4b can be used in a continuous mode to emulate current in a power converter. That is, even if capacitor Cv maintains a positive or negative voltage value at the end of a discharge cycle, such an error can be inconsequential in continuous mode, since secondary switch 132 is caused to turn off when primary switch 131 turns on in continuous mode, and any potential DC offset error is removed during reset.

FIG. 4b illustrates a comparator COMP1 with an input coupled to capacitor Cv. Comparator COMP1 compares the voltage across capacitor Cv to a voltage reference REF1. Reference voltage REF1 can be a low positive reference voltage, for example. When the voltage on capacitor Cv falls below reference voltage REF1, comparator COMP1 changes state to provide a logic high output, or a "1", which triggers a monostable flip-flop MONO1. The output of monostable flip-flop MONO1 momentarily closes a switch S1 to short capacitor Cv to ground, thereby dissipating any charge deposited on capacitor Cv that was not discharged during the previous cycle.

The output of comparator COMP1 changes state to a logic high value near a zero value for current in inductor L1. Accordingly, the output of comparator COMP1 may be used as a signal to initiate turnoff of a synchronous rectifier in accordance with the disclosed system and method.

Referring now to FIG. 4c, a block diagram of a current emulator is illustrated, which represents an implementation as show in FIG. 4b. Current emulator 42 has inputs 44, 46, which are representative of connections provided on either side of inductor L1. Current emulator 42 also has an output 45, representative of an output of comparator COMP1. Accordingly, current emulator 42 operates with two input voltages that represent a voltage across inductor L1, and provides an output 45 that is used to switch a synchronous rectifier coupled to inductor L1. As should be apparent, current emulator 42 may be implemented in accordance with a number of other topologies to emulate current in inductor L1. For example, current emulator 42 may be implemented to operate in any one of continuous, transition or discontinuous modes, for example by causing the discharge voltage on capacitor Cv to be positive, zero or negative when secondary switch 132 is turned off. In addition, diode D2 may be configured for a positive or a negative voltage values on capacitors Cv, or diode D2 may be removed all together. The main concept of providing current emulation and a switching signal for a synchronous rectifier based on the current emulation is reflected in the representation of current emulator 42 as a generalized box, which box is used generically with various embodiments of the disclosed system and method discussed in greater detail below.

Figure 5:
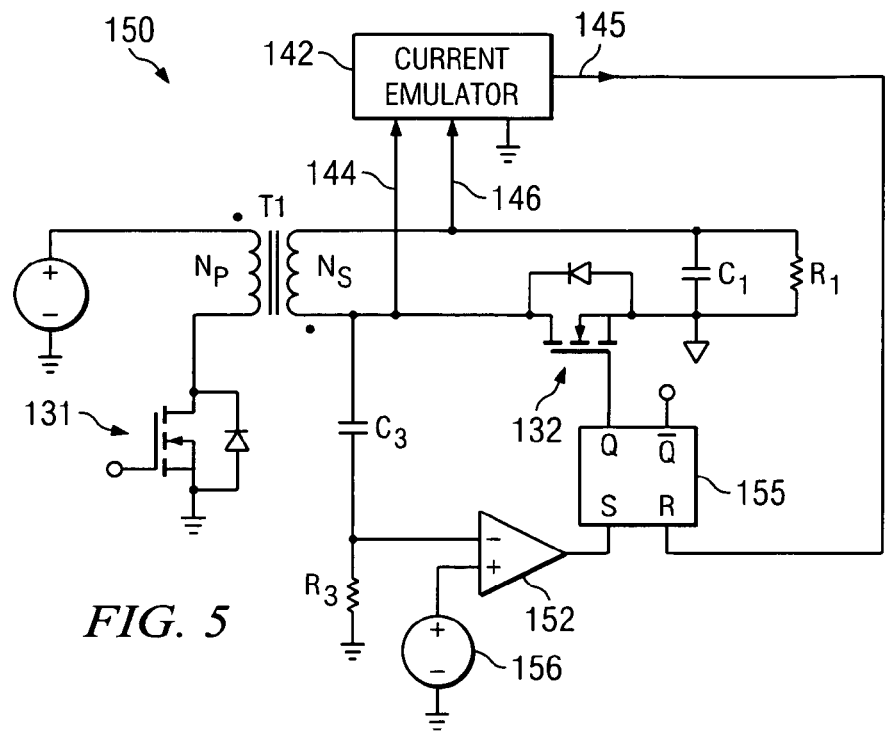
FIG. 5 is a circuit diagram of a control for the synchronous rectifier in accordance with an exemplary embodiment of the disclosed system and method.

Referring now to FIG. 5, a circuit block diagram of a power converter 150 in accordance with the disclosed system and method is illustrated. Circuit 150 includes current emulator 142 as described and illustrated with FIGS. 4a-4c. Current emulator 142 provides an output signal 145 used to turn off synchronous rectifier switch 132 through SR flip-flop 155. When signal 145 becomes a logic high or "1", flip-flop 155 is reset, turning off switch 132. As described above, signal 145 becomes a logic high when current through the secondary side of transformer T1 becomes or approaches zero in normal operation. The indication of zero current through the secondary side of transformer T1 provided by signal 145 of current emulator 142 need not be exactly coincident with zero current in the secondary side of transformer T1, since small amounts of variation in detecting a zero crossing of transformer secondary side current results in insignificant losses due to non-zero current switching.

Circuit 150 also illustrates an arrangement for turning on synchronous rectifier switch 132 using detection of a switching transition when primary switch 131 turns off. In such an event, an RC circuit composed of a resistor R3 and a capacitor C3 generate a negative pulse that triggers a comparator 152. Comparator 152 has an input threshold on the non-inverting input, which is a reference voltage 156 with a relatively small value. For example, the value of voltage reference 156 may be a small negative value on the order of a few volts or millivolts, which is an easy voltage to sense, especially in comparison to the value of the output voltage of circuit 150, which may be in the range of approximately 30 volts, for example. Because the output voltage of circuit 150 is much greater than the voltage on switch 132, sensing of transitions is simplified due to having a higher level of discrimination between sensing levels, i.e., when switch 132 should be turned on or off. The negative pulse provided to the inverting input of comparator 152 is illustrated with respect to FIGS. 7a, 7b, in which a turnoff transition for primary switch 131 is detected based on a rapid voltage decrease on the drain of secondary switch 132. The rapid voltage decrease, or collapse of voltage observed on the drain of secondary switch 132, which occurs when primary switch 131 is turned off, is detected using an appropriate time constant in the RC circuit composed of resistor R3 and capacitor C3. Accordingly, the component values of resistor R3 and capacitor C3 are chosen to produce a negative voltage pulse based on a fast dv/dt transition on the drain of secondary switch 132. This detected transition is compared against voltage reference 156 to produce a change in state for the output of comparator 152. The state change causes flip-flop 155 to be set, thereby providing an output to control secondary switch 132 to turn on.

In addition, as the voltage on the drain of secondary switch 132 collapses when primary switch 131 turns off, current emulator 142 begins discharging capacitor Cv (FIG. 4b) to emulate current in the secondary side of transformer T1 to provide an indication for when secondary switch 132 should be turned off.

Figure 6:
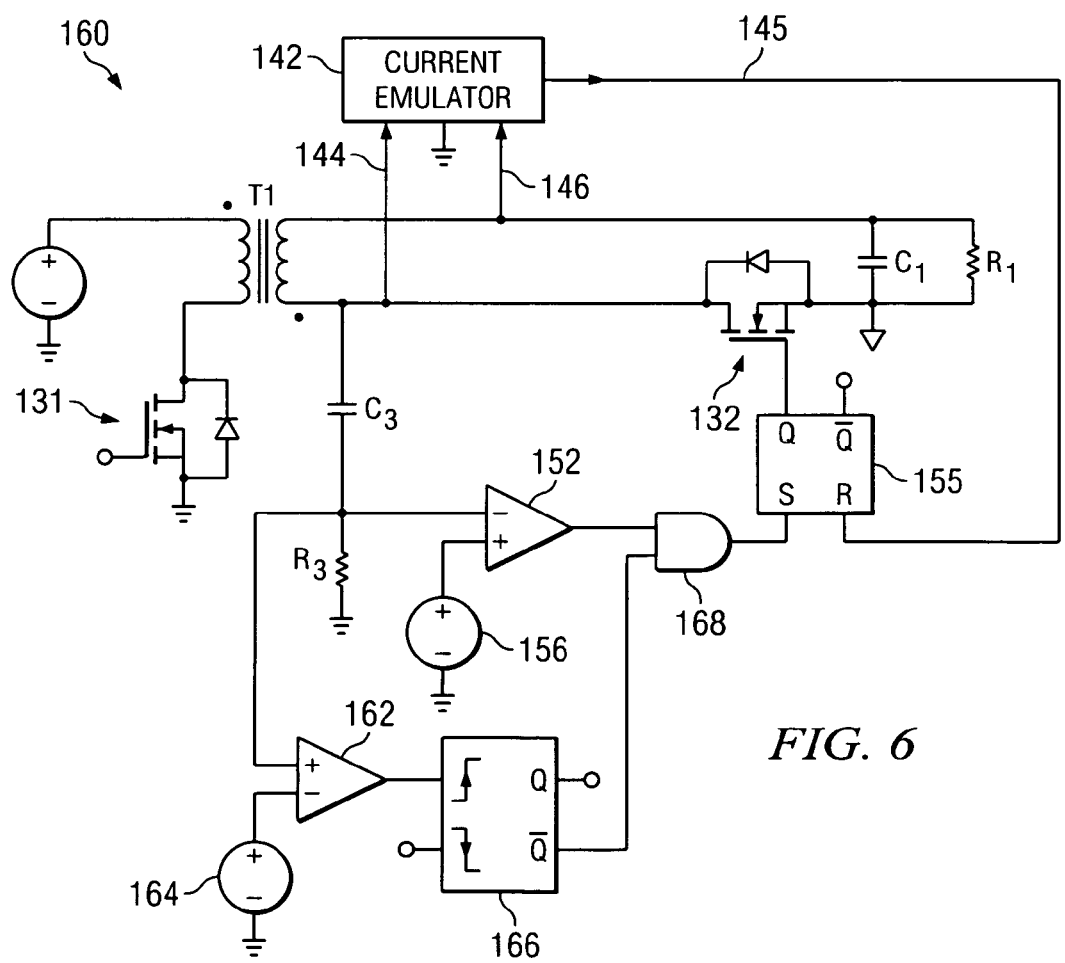
FIG. 6 is a circuit diagram of a synchronous rectifier control with a blanking interval according to an exemplary embodiment of the disclosed system and method.

Referring now to FIG. 6, a circuit block diagram of a power converter 160 in accordance with the disclosed system and method is illustrated. Circuit 160 illustrates the implementation of a blanking interval for detecting events used to cause secondary switch 132 to turn on. A comparator 162 receives the pulses generated with the RC circuit composed of resistor R3 and capacitor C3 on a non-inverting input. The inverting input of comparator 162 is coupled to a reference voltage 164 that provides a threshold to detect a rapid positive going transition on the drain of secondary switch 132. The output of comparator 162 is provided to the input of a monostable one-shot timer 166 to initiate an interval for blanking out detection of negative transitions sensed through comparator 152. The inverted output of timer 166 is provided to an AND gate 168 to serve as a blanking interval implementation. When the inverted output of timer 166 is a logic low level, or a "0", AND gate 168 is disabled, which prevents an unwanted transition of comparator 152 from causing flip-flop 155 to be set. The scenario that may cause unwanted transitions, and the attendant blanking interval are illustrated in FIGS. 7a-7c.

Figure 7A:
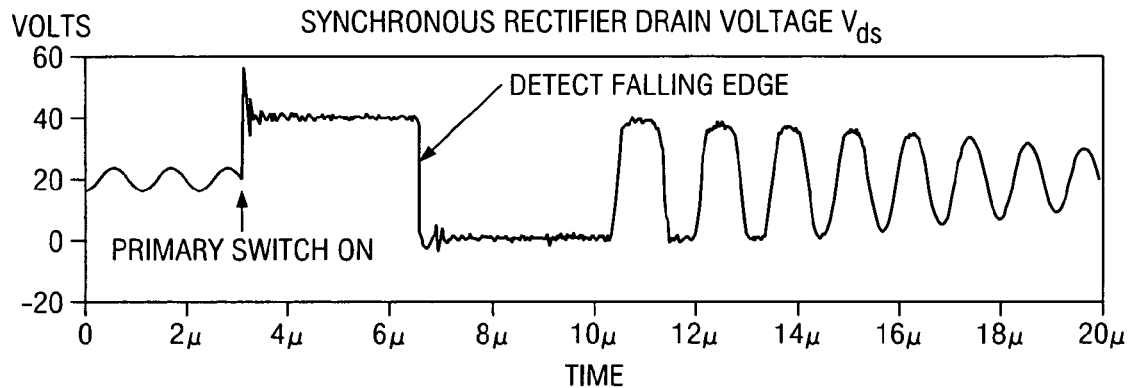
FIGS. 7a-7c are graphs illustrating voltages in the circuit block diagram of FIG. 6.
Figure 7B:
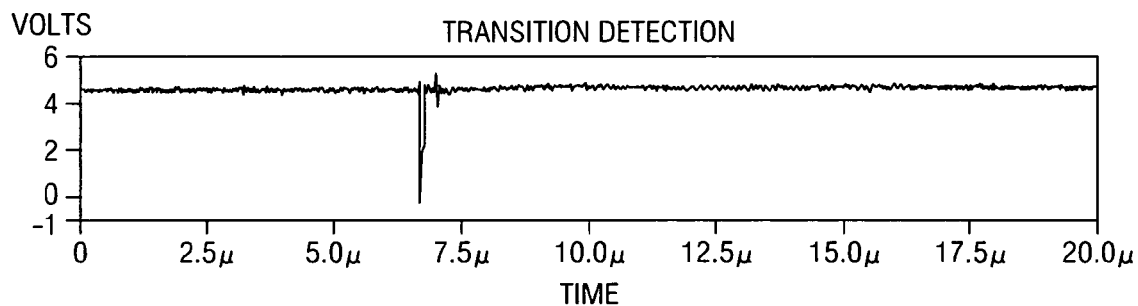
Figure 7C:
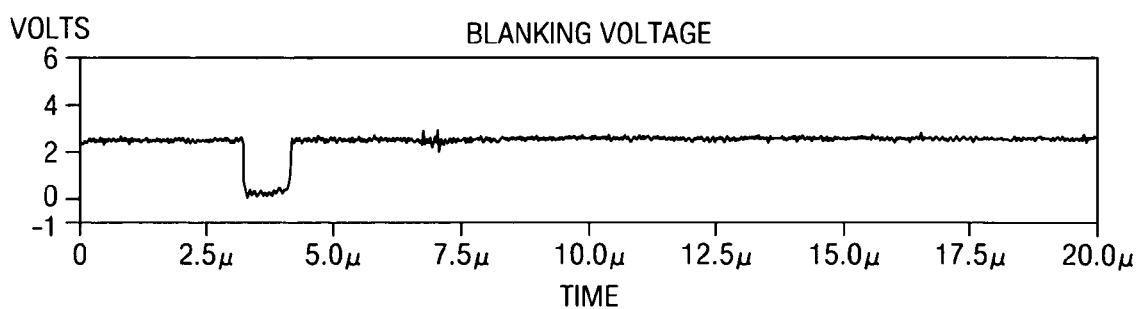

Referring to FIGS. 7a-7c, graphs for the operation of circuit 160 are illustrated. In FIG. 7a, drain voltage Vds illustrates where primary side switch 131 turns on and off, and how voltage Vds is used to detect when secondary side switch 132 should be turned on. Because there is some ringing in drain voltage Vds when the primary switch is turned on, a blanking signal is used to prevent false detections from causing switch 132 to be turned on. FIG. 7c shows an interval provided by timer 166 being triggered by the turn-on of primary switch 131, as detected through comparator 162. Once the blanking interval terminates, the inverted output of timer 166 becomes a logic high level or a logic "1", thereby enabling AND gate 168. The blanking interval prevents flip-flop 155 from changing state when drain voltage Vds exhibits ringing with high dv/dt that may cause comparator 152 to change state. As can be seen in FIG. 7c, an exemplary embodiment has a blanking interval being applied for approximately 0.9 μs.

Figure 8:
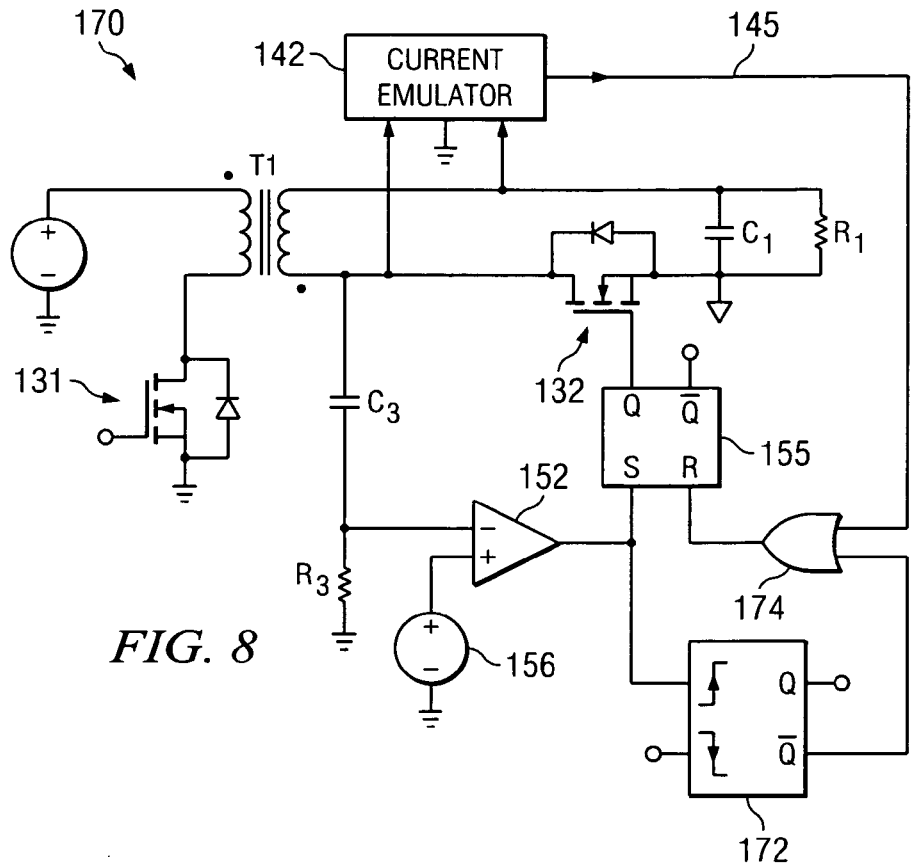
FIGS. 8-12 each illustrate a circuit diagram of a synchronous rectifier control that prevents cross-conduction according to various exemplary embodiments of the disclosed system and method.

Referring now to FIG. 8, a circuit block diagram for a power converter circuit 170 in accordance with an exemplary embodiment of the disclosed system and method is illustrated. Circuit 170 illustrates additional techniques for ensuring or maintaining an off state for secondary switch 132. As described previously with respect to FIG. 5, comparator 152 supplies a signal to cause flip-flop 155 to be set, thereby turning on secondary switch 132. The output of comparator 152 is also provided to a monostable one-shot timer 172 that is programmable with a variable time duration. The inverted output of timer 172 is provided to OR gate 174 to cause a reset of flip-flop 155 when active. OR gate 174 also receives signal 145 from current emulator 142, which resets flip-flop 155 when active.

Situations may arise in the operation of power converter circuit 170 in which the output voltage provided across a resistor R1 or capacitor C1 drops to zero due to a fault, such as a short circuit, for example. In such an event, current emulator 142 may not provide a logic high output for signal 145, since capacitor Cv illustrated in FIG. 4b may not be able to discharge completely to zero, or below voltage reference REF1 illustrated in FIG. 4b. In such a fault condition, secondary switch 132 may be maintained in a conducting state, which may lead to cross-conduction between primary switch 131 and secondary switch 132. That is, primary switch 131 may receive a turn-on signal for a new switching cycle, while secondary switch 132 remains in an on state. The situation which primary switch 131 and secondary switch 132 are both on leads to cross-conduction, where current can flow through the reference ground potential, potentially damaging one or more of switches 131, 132. To avoid the potential for cross-conduction in the event of a fault such as that described above, timer 172 and OR gate 174 are provided to ensure secondary switch 132 turns off after a given interval of time after it was turned on. Accordingly, when secondary switch 132 is turned on by the output of flip-flop 155, a signal from comparator 152 also causes timer 172 to start to provide an interval during which switch 132 may remain in an on state. Under normal circumstances, signal 145 from current emulator 142 becomes a logic high level when current through the secondary side of transformer T1 is zero, causing flip-flop 155 to be reset, and secondary switch 132 to be turned off. In the case where the output of power converter circuit 170 is shorted and the value of the output voltage prevents current emulator 142 from producing a low to high transition for signal 145, timer 172 provides a signal after a predetermined period of time to cause flip-flop 155 to reset, thereby turning off secondary switch 132. The length of the time interval for which timer 172 is set is typically less than a switching cycle to avoid cross-conduction when primary switch 131 is turned on. The length of the time interval of timer 172 is also greater than a length of time for capacitor Cv illustrated in FIG. 4b to be discharged in discontinuous or transition mode.

Figure 9:
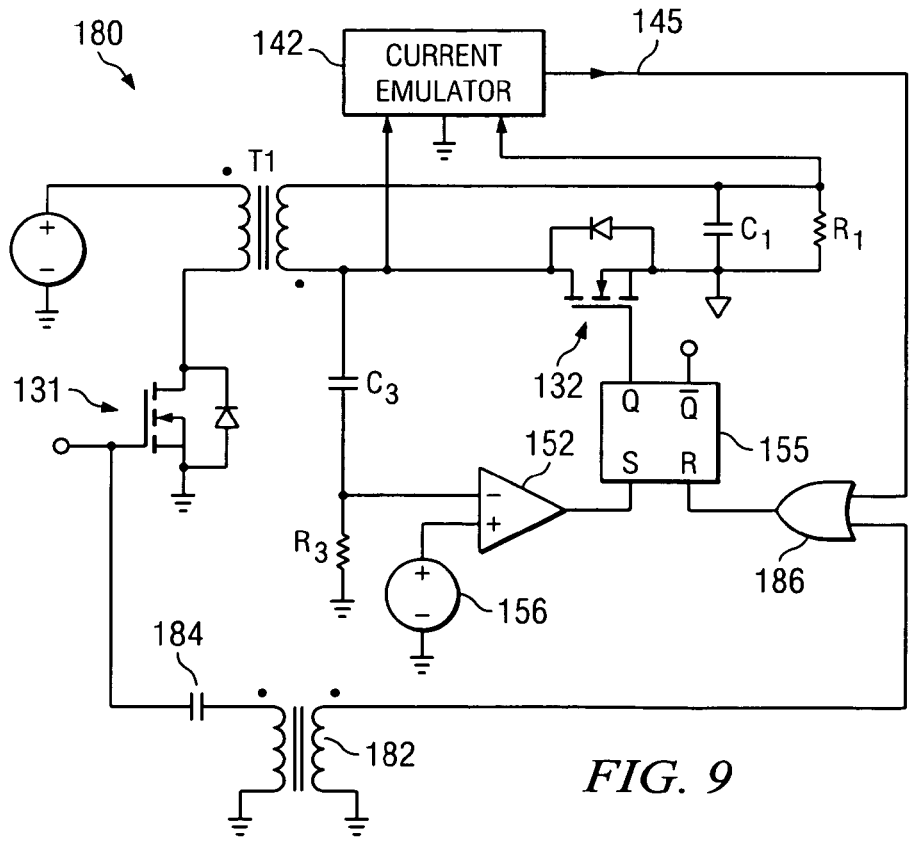

Referring now to FIG. 9, a power converter circuit 180 in accordance with an exemplary embodiment of the disclosed system and method is illustrated. Circuit 180 illustrates another exemplary embodiment for preventing cross-conduction between primary switch 131 and secondary switch 132. Flip-flop 155 has a reset input tied to an output of an OR gate 186, which can be transitioned by inputs from current emulator 142 or a pulse transformer 182. That is, flip-flop 155 is reset if a logic high level is produced by signal 145 or by the secondary side of pulse transformer 182. A capacitor 184 is coupled to a gate input of primary switch 131. Capacitor 184 detects a positive voltage transition on the gate input to primary switch 131. The transition on the gate of primary switch 131 indicates a turn on event, which is captured by capacitor 184 in the form of a pulse due to the fast transition of the signal applied to the gate of primary switch 131. The pulse produced by capacitor 184 is transferred through pulse transformer 182 in the form of a positive logic level pulse applied to OR gate 186. Accordingly, when a turn-on signal is applied to the gate of primary switch 131, a pulse is developed on capacitor 184 that is transferred through pulse transformer 182 and OR gate 186 to reset flip-flop 155. When flip-flop 155 is reset, secondary switch 132 turns off, even if a logic high level is not provided by signal 145 as a result of current emulator 142 indicating zero current through the secondary side of transformer T1. Such an event may occur, for example, if the output of circuit 180 is shorted, which may prevent capacitor Cv as part of current emulator 142 from completely discharging, or discharging at an expected rate.

Figure 10:
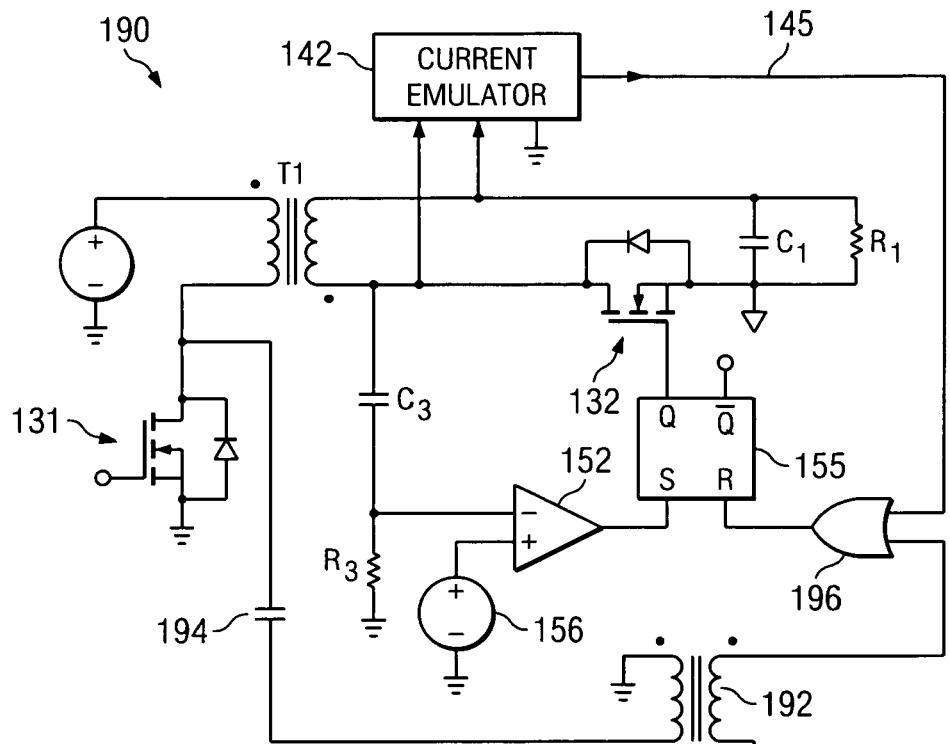

Referring now to FIG. 10, another exemplary embodiment of a power converter circuit 190 in accordance with the disclosed system and method is illustrated. Circuit 190 provides another exemplary embodiment of an arrangement to prevent cross conduction between primary switch 131 and secondary switch 132. In circuit 190, a capacitor 194 is connected to the drain of primary switch 131, and also connected to a primary side of a pulse transformer 192. Capacitor 194 is charged while primary switch 131 is off. When primary switch 131 turns on, capacitor 194 discharges, causing a pulse to be applied to pulse transformer 192. The pulse is transferred to OR gate 196, and in turn applied to the reset input of flip-flop 155, thereby turning off or maintaining an off state for secondary switch 132. Accordingly, when primary switch 131 turns on, a signal is applied to reset flip-flop 155 to turn off secondary switch 132 thereby preventing cross-conduction between switches 131, 132.

Figure 11:
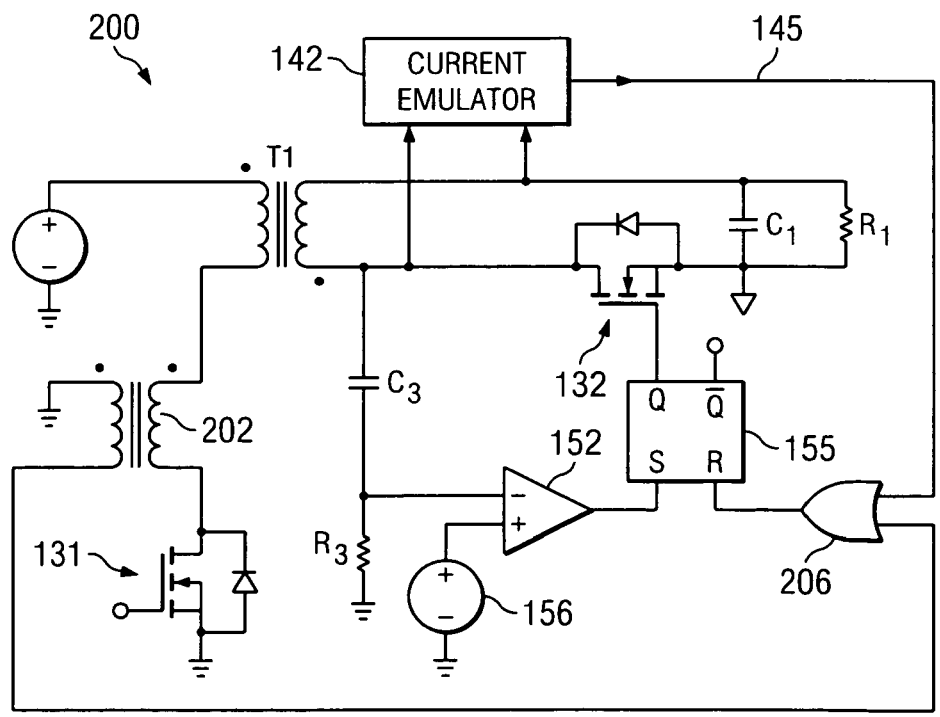

Referring now to FIG. 11, another exemplary embodiment of a power converter circuit 200 according to the disclosed system and method is illustrated. Circuit 200 prevents cross-conduction between switches 131 and 132 by obtaining a turn off signal with a pulse transformer 202 coupled to the drain of primary switch 131. Pulse transformer 202 produces a pulse when primary switch 131 turns on, the pulse being transferred to OR gate 206 and applied to a reset input of flip-flop 155 to signal secondary switch 132 to turn off. Accordingly, as primary switch 131 turns on, secondary switch 132 is turned off if it is in an on state. With this arrangement, if signal 145 does not provide a logic high level when current emulator 142 should indicate zero current on the secondary side of transformer T1, the signal provided by pulse transformer 202 ensures secondary switch 132 is turned off to prevent cross-conduction between switches 131, 132.

Figure 12:
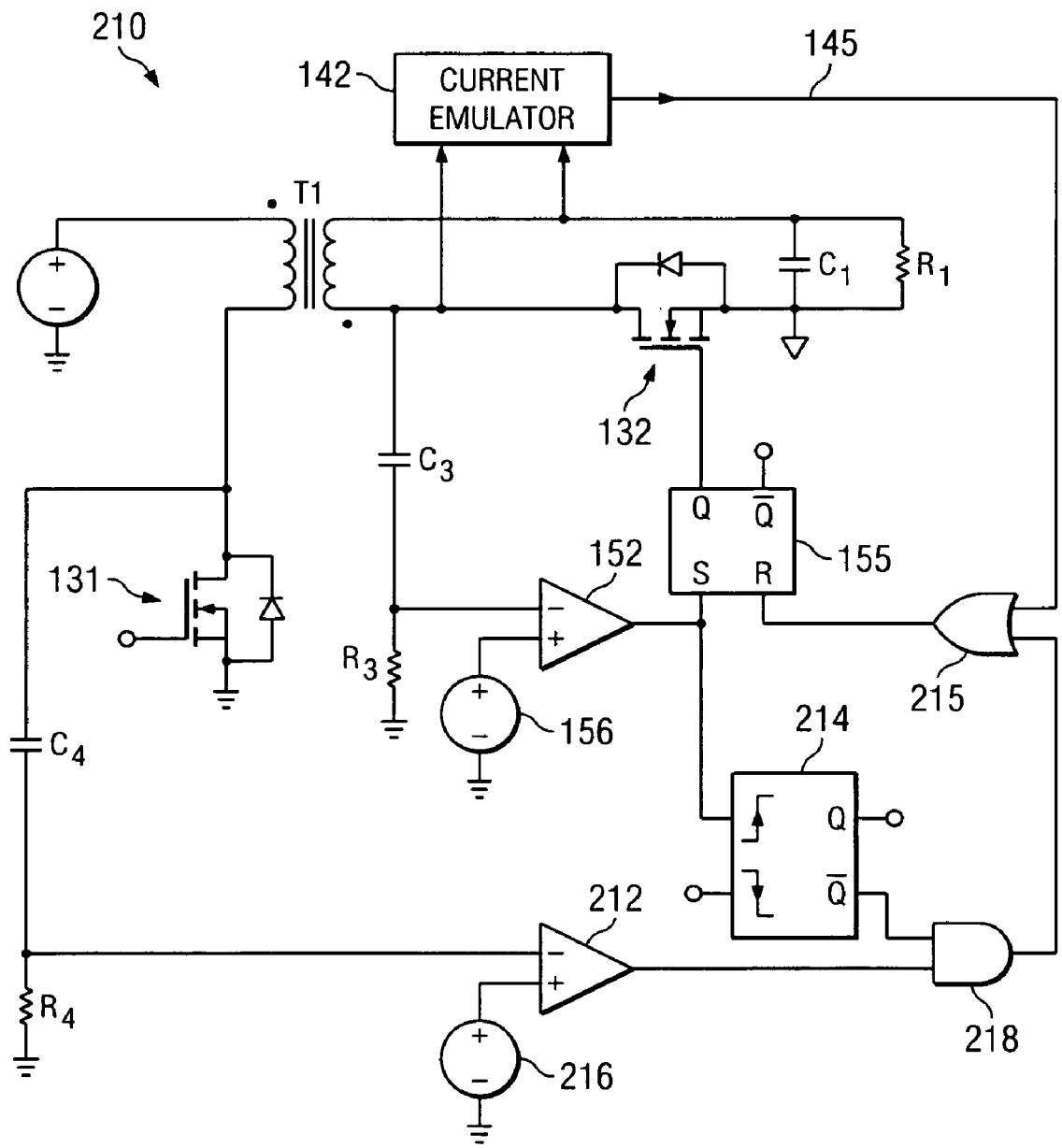

Referring now to FIG. 12, an exemplary embodiment of a power converter circuit 210 in accordance with an exemplary embodiment of the disclosed system and method is illustrated. Circuit 210 provides an RC circuit composed of a resistor R4 and a capacitor C4 that senses a negative transition on the drain of primary switch 131. A negative transition on the drain of switch 131 indicates switch 131 is turning on, and may be used as a signal to turn off secondary switch 132, or ensure that secondary switch 132 is in an off state. The RC circuit composed of resistor R4 and capacitor C4 has a time constant designed to capture fast transitions with high dv/dt to avoid generating a pulse during unwanted voltage changing events, such as may occur with ringing, which events typically have a lower relative dv/dt. The negative pulse generated by resistor R4 and capacitor C4 is applied to the inverting input of comparator 212 to cause the output of comparator 212 to change state when a negative transition is observed on the drain of primary switch 131. The negative transitions of interest on the drain of primary switch 131 are those when primary switch 131 is turning on to cause secondary switch 132 to turn off or stay off.

If the drain of primary switch 131 experiences fast negative transitions during ringing events, an AND gate 218 prevents a change in state of the output of comparator 212 from resetting flip-flop 155. That is, when a negative transition is observed on the drain of secondary switch 132, such that comparator 152 is triggered to set flip-flop 155 to turn on secondary switch 132, a negative transition that occurs through ringing on the drain of primary switch 131 should not reset flip-flop 155. Accordingly, when secondary switch 132 is to be turned on by detection of a negative transition on the drain of secondary switch 132, a monostable one-shot acting as a timer 214 provides a blanking interval in conjunction with AND gate 218 to prevent transitions on the output of comparator 212 from resetting flip-flop 155 and turning secondary switch 132 off. In the case where primary switch 131 is turning on, timer 214 should not be triggered, so that the inverted output of timer 214 enables AND gate 218, to permit a low-to-high transition on the output of comparator 212 to reset flip-flop 155 and turn off secondary switch 132 to prevent cross-conduction between switches 131, 132. This safety feature to prevent cross-conduction between switches 131, 132 is useful in situations, such as those described above, where signal 145 output from current emulator 142 does not transition to a high level state to cause flip-flop 155 to be reset within an expected time frame to indicate that there is zero current in the secondary winding of transformer T1. Such a circumstance may occur if the output of power converter circuit 210 is shorted, such that capacitor Cv (FIG. 4b) does not discharge as desired, so that the turn off of secondary switch 132 would be delayed.

Figure 13:
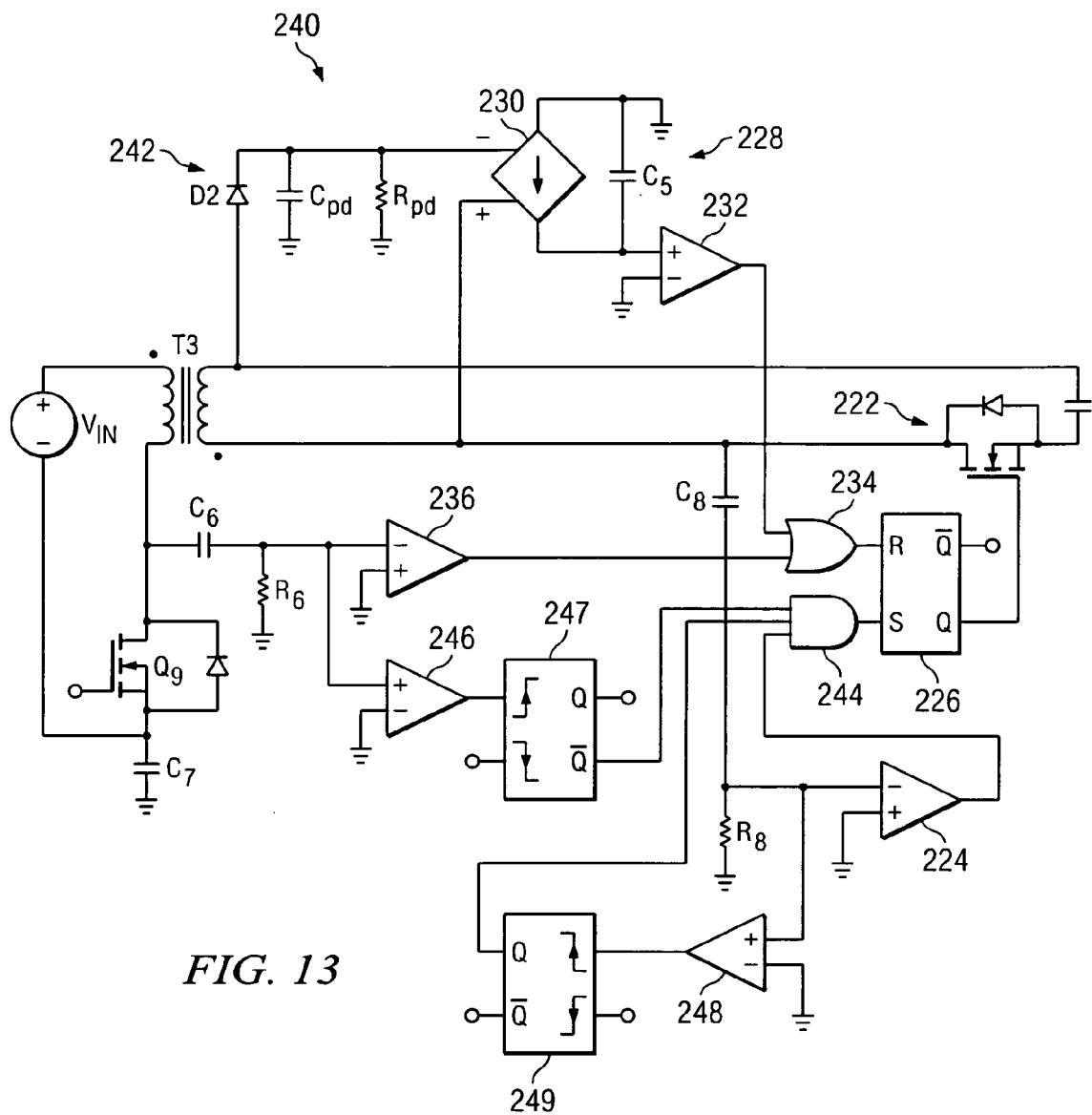
FIG. 13 is a circuit diagram of a synchronous rectifier control that prevents cross-conduction and provides blanking according to an embodiment of the disclosed system and method.

Referring now to FIG. 13, a flyback converter 240 illustrates additional features of the disclosed system and method. Flyback converter 240 includes a current emulator 228 that operates to create a replica of the synchronous rectifier current by examining output voltage. A value of the output voltage is captured with a peak detecting network 242 consisting of diode D2, capacitor Cpd and resistor Rpd. When primary switch Q9 turns off, and the drain voltage of a secondary switch 222 experiences a downward transition, the voltage applied to current source 230 changes polarity. The peak output voltage value is stored in peak detecting network 242. The stored output voltage value causes capacitor C5 to be discharged. When the voltage on capacitor C5 decreases to slightly less than zero, comparator 232 changes state to produce a high logic level, which is transferred through OR gate 234 to reset flip-flop 226. The reset of flip-flop 226 causes synchronous rectifier switch 222 to turn off.

Peak detecting network 242 captures a peak output voltage that can be used in the discharge cycle for discharging capacitor C5. By capturing the peak output voltage value, and avoiding use of instantaneous output voltage, current emulator 228 continues to operate properly even if the output voltage experiences a fault. For example, if the output voltage is abruptly dropped to zero volts, such as in the case of a short circuit, capacitor C5 would not discharge properly, since current source 230 would not properly sink current from capacitor C5. By capturing a peak voltage value in peak detecting network 242, current source 230 continues to operate properly to discharge capacitor C5, even if there is a fault on the output of flyback converter 240.

For added safety, flip-flop 226 is also reset if switch Q9 turns on to avoid cross-conduction. The RC circuit composed of resistor R6 and capacitor C6 produce a negative pulse when switch Q9 turns on. The negative pulse causes comparator 236 to transition to a high logic output, which resets flip-flop 226.

An AND gate 244 provides setup conditions for initiating turn-on for switch 222 through an SR flip-flop 226 by combining several blanking elements with detection of turn-off of primary switch Q9. A comparator 224 provides a signal indicating detection of turn-off of primary switch Q9 as a negative transition on the drain of switch 222. A comparator 246 and a monostable one-shot timer 247 produce a logic low output applied to AND gate 244 to prevent setting RS flip-flop 226 for a short period of time after primary switch Q9 turns off. The short delay provided by comparator 246 and timer 247 should be made sufficiently long enough to ensure that primary switch Q9 is well on its way to turning off before synchronous rectifier switch 222 is turned on to prevent cross-conduction events.

A comparator 248 and a monostable one-shot timer 249 provide a blanking interval to disable AND gate 244 when the drain of switch 222 experiences fast negative transitions, as may occur during ringing when primary switch Q9 turns on. This blanking interval prevents comparator 224 from causing flip-flop 226 to be set, to avoid unwanted turn-on events for switch 222.

As discussed above, the turn on of a primary switch may be used to cause a secondary switch to turn off when operated as a synchronous rectifier. The current emulator can be configured to operate on the basis of a charging and discharging capacitor, that discharges to a positive, zero or negative value to provide a signal to turn off the secondary switch. This configuration permits the synchronous rectifier to turn off with negligible losses, and allows the power converter to operate in continuous, transition or discontinuous modes. For example, in continuous mode the primary switch turn-on causes the secondary switch to be turned off, so that the state of the current emulator can be inconsequential.

Figure 14:
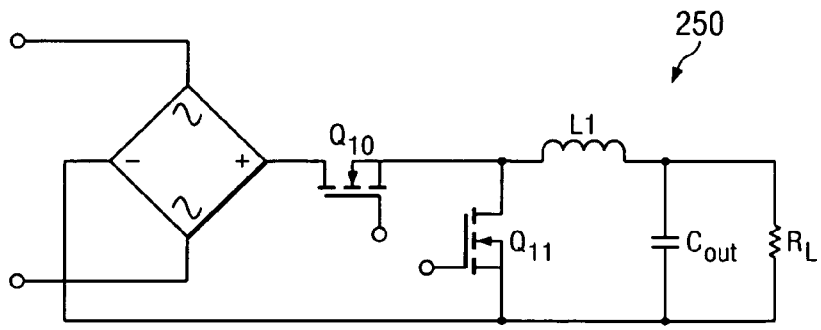
FIG. 14 is a circuit block diagram of a forward or buck converter.

Referring now to FIG. 14, a buck converter 250 is illustrated. The disclosed system and method can be used with buck converter 250, in which a free-wheeling rectifier Q11 is controlled during operation in discontinuous mode. A current emulator provides a signal to indicate when synchronous rectifier switch Q11 should be turned off, to permit operation in discontinuous or transition mode.

The disclosed system and method provides a control for operation of a synchronous rectifier in a power converter using relatively large, easy to sense signals, without the need of on-chip high voltage withstand capability. The accuracy and speed tolerances are somewhat modest in the disclosed system and method, which has a relatively simple architecture to obtain a low cost control that is compatible with the power converter, especially in a flyback converter application. The disclosed system and method can provide a "diode emulator," and may boost efficiency by two percentage points or more. The disclosed system and method may also permit improvement of cross regulation in multi-output power converters, including flyback converters, in addition to being applicable to the free wheeling rectifier in discontinuous buck derived converters, as discussed above.

The above-described control systems utilize short duration pulses obtained by inspecting transitions on power switches to improve performance. When the pulses obtained from inspection of the power switches are used, a logic response can be fast to permit an improved control for an inductor based power converter in accordance with the disclosed system and method. Because a pulse derived from a relatively high dv/dt event is used for control purposes, a number of other control circuits have been described to avoid or prevent inadvertent control activation that may occur through sensing wave forms that may have relatively fast dv/dt events at particularly undesirable times other than those times of interest. It should be apparent that a number of the fundamental control scenarios may be used in accompaniment with the disclosed system and method to obtain the goal of providing a current emulator for determining when a synchronous rectifier should be turned off. For example, the control scenarios may operate based on transitions rather than pulses to obtain a rapid response that may have less associated compensation elements. That is, there may be less of a usage of components for blanking intervals in different control strategies.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A power converter with a primary switch coupled to a current storage device for switching current in the current storage device and a synchronous rectifier coupled to the current storage device, comprising:
    a primary switch transition detector coupled to the current storage device for detecting primary switch transitions;
    a current emulator coupled to the current storage device and responsive to a voltage across the current storage device to emulate current, the current emulator having an output signal representative of current in the current storage device; and
    the synchronous rectifier being switched in accordance with a transition of the primary switch detected by the primary switch transition detector and in accordance with the output signal of the current emulator.

2. The converter according to claim 1, wherein:
    the converter is a flyback converter; and
    the current storage device is implemented as a transformer with a primary side to which the primary switch is coupled, and a secondary side to which the primary switch transition detector and synchronous rectifier are coupled.

3. The converter according to claim 1, further comprising a comparator coupled to the output signal of the current emulator, the comparator being operable to change state when the output signal crosses a threshold value applied to the comparator, the comparator state change being used to switch the synchronous rectifier to an off state.

4. The converter according to claim 3, wherein the threshold value is less than zero.

5. The converter according to claim 3, wherein the threshold value is greater than zero.

6. The converter according to claim 1, wherein the current emulator output signal indicates when the current in the current storage device has decayed to about zero.

7. The converter according to claim 6, wherein the indication provided by the current emulator output signal is used to switch the synchronous rectifier to an off state.

8. The converter according to claim 1, wherein the current emulator emulates current in the current storage device by forming a volt-second product during the interval in which the primary switch is in an on state.

9. The converter according to claim 8, wherein the current emulator output signal indicates when the current storage device has produced a volt-second product during discharge that is about the same as the volt-second product that is produced during charging.

10. The converter according to claim 9, wherein the indication provided by the current emulator is used to switch the synchronous rectifier to an off state.

11. The converter according to claim 1, wherein the converter is operated in discontinuous or transition mode.

12. The converter according to claim 1, further comprising a timer device coupled to the current storage device to time a predetermined interval after a transition of the primary switch.

13. The converter according to claim 12, wherein the expiration of the timer device is used to switch the synchronous rectifier to an off state.

14. The converter according to claim 1, wherein the primary switch transition detector further comprises a primary switch on transition detector, the primary switch on transition detector being configured to provide an indication of when the primary switch transitions to an on state, the indication being used to switch the synchronous rectifier to an off state if the synchronous rectifier is in an on state.

15. The converter according to claim 7, further comprising a current emulator blanking interval generator having a blanking output signal for blocking switching of the synchronous rectifier to an on state after the current emulator indication of the current storage device current having decayed to about zero is used to switch the synchronous rectifier to an off state.

16. The converter according to claim 1, wherein the primary switch transition detector detects a primary switch transition to an off state and provides an indication that is used to switch the synchronous rectifier to an on state.

17. The converter according to claim 1, wherein the primary switch transition detector further comprises a transition comparator coupled to the current storage device and operable to change state when a voltage on the current storage device crosses a threshold value applied to the transition comparator to indicate that the primary switch has transitioned to an off state.

18. The converter according to claim 13, further comprising a dV/dt detector coupled to the current storage device for discriminating between relatively slow and fast voltage transitions.

19. A method for operating a synchronous rectifier in a power converter having a primary switch coupled to a current storage device and having the synchronous rectifier coupled to the current storage device, the method comprising:
    detecting transitions of the primary switch by inspecting waveforms on the current storage device;
    emulating current in the current storage device based on the detected primary switch transitions to produce an output signal representative of current in the current storage device; and
    switching the synchronous rectifier in accordance with the detected transitions of the primary switch and the output signal representative of current in the current storage device.

20. The method according to claim 19, wherein:
    the current storage device is implemented as a transformer having a primary side and a secondary side;
    detecting transitions of the primary switch further comprises inspecting waveforms on the secondary side of the transformer; and
    emulating current in the current storage device further comprises emulating current in the primary and the secondary side of the transformer.

21. The method according to claim 19, further comprising comparing the output signal representative of current in the current storage device with a threshold value and switching the synchronous rectifier to an off state when the output signal crosses the threshold value.

22. The method according to claim 21, wherein the threshold value is less than zero.

23. The method according to claim 21, wherein the threshold value is greater than zero.

24. The method according to claim 19, further comprising determining when the current in the current storage device has decayed to about zero by inspecting the output signal representative of current in the current storage device.

25. The method according to claim 24, further comprising switching the synchronous rectifier to an off state when the current in the current storage device is determined to be about zero.

26. The method according to claim 19, wherein emulating current in the current storage device further comprises forming a volt-second product during the interval in which the primary switch is in an on state.

27. The method according to claim 26, further comprising determining when the current storage device has produced a volt-second product during discharge that is about the same as the volt-second product formed during the interval in which the primary switch is in an on state.

28. The method according to claim 27, further comprising switching the synchronous rectifier to an off state to thereby avoid saturation of the current storage device.

29. The method according to claim 19, further comprising operating the converter in discontinuous or transition mode.

30. The method according to claim 19, further comprising determining the termination of a predetermined interval of time after a transition of the primary switch.

31. The method according to claim 30, further comprising switching the synchronous rectifier to an off state at the termination of the interval of time.

32. The method according to claim 19, further comprising:
    detecting when the primary switch transitions to an on state; and
    switching the synchronous rectifier to an off state based on detecting the primary switch on transition if the synchronous rectifier is in an on state.

33. The method according to claim 25, further comprising blocking switching of the synchronous rectifier to an on state after the current emulator indication of the current in the current storage device having decayed to about zero is used to switch the synchronous rectifier to an off state.

34. The method according to claim 19, further comprising:
    detecting a primary switch transition to an off state; and switching the synchronous rectifier to an on state upon detecting the primary switch transition to an off state.

35. The method according to claim 19, further comprising comparing a voltage on the current storage device to a threshold value to determine when the primary switch transitions to an off state.

36. The method according to claim 33, further comprising:
detecting dv/dt transitions in the current storage device beyond a predetermined level.

37. A controller for a synchronous rectifier coupled to a current storage device in a power converter having a primary switch for transferring input power to the current storage device, comprising:

a primary switch transition detector coupled to the synchronous rectifier for detecting primary switch transitions;

a current emulator coupled to the current storage device and responsive to a detected primary switch transition to emulate current in the current storage device, the current emulator having an output signal representative of current in the current storage device; and a switching mechanism for switching the synchronous rectifier in accordance with a transition of the primary switch detected by the primary switch transition detector and in accordance with the output signal of the current emulator.

* * * * *